United States Patent [19]

Tostado

[11] 4,352,336
[45] Oct. 5, 1982

[54] ADJUSTABLE CLEAT

[76] Inventor: Ramon Tostado, 915 W. Kensington Rd., Los Angeles, Calif. 90026

[21] Appl. No.: 170,590

[22] Filed: Jul. 21, 1980

[51] Int. Cl.³ .............................................. B63B 21/08
[52] U.S. Cl. .................................. 114/218; 24/132 R; 114/199
[58] Field of Search ............. 114/218, 199; 24/132 R, 24/132 AA

[56] References Cited

U.S. PATENT DOCUMENTS

| 701,277 | 6/1902 | Adams | 24/132 R |
| 1,270,016 | 5/1872 | Bishop | 24/132 R |
| 4,080,918 | 3/1978 | Bonhard | 24/132 R X |

FOREIGN PATENT DOCUMENTS 7810 of 1875 United Kingdom ................ 114/218

Primary Examiner—Sherman D. Basinger
Attorney, Agent, or Firm—Allan M. Shapiro

[57] ABSTRACT

Cleat has a base for mounting on deck or dock, with cleat head pivotably mounted to rock on the base. The horns on the head coact with the base to reliably and releaseably clamp line therebetween for secure cleating of the line. The spacing between the horns and the base is adjustable by adjustment of the pivot axis of the head on the base.

8 Claims, 7 Drawing Figures

ADJUSTABLE CLEAT

BACKGROUND OF THE INVENTION

This invention is directed to an adjustable cleat for the secure cleating attachment of lines for mooring boats and other line securement.

Flexible lines have long served as a means for connection between various devices and equipment. They are widely used on boats and ships, and particularly sailboats where various lines are employed to control various sail functions. Additionally, various lines are used for mooring or docking boats. Flexible lines are also used for various non-nautical purposes, such as for hoists and pulling devices. Often, such lines must be temporarily attached to hold the boat against the dock and to hold the hoist line in position. Easy, quick and reliable attachment is desirable, together with ease of release of the line when release is desired. Consequently, several types of bitts, cleats and bollards have been designed for the securement of such lines. Some of the prior structures are particularly designed so that they will not catch lines when lines move across them, see Thompson U.S. Pat. Nos. 107,738; Winther 2,870,733; Bigelow 3,126,859; and Johnson 3,597,808. While these structures have a movable part, they are designed to move from a functioning position to a non-functioning position. Another two-piece cleat is represented by Semolic U.S. Pat. No. 2,833,240. Thus, there is a need for a structure which enhances cleating force on a line.

SUMMARY OF THE INVENTION

In order to aid in the understanding of this invention, it can be stated in essentially summary form that it is directed to an adjustable cleat. The cleat has a base on which is mounted a head. The head has horns and is pivotably mounted with respect to the base so that it can rock with respect thereto so that the horns move in a line-clamping motion with respect to the base. Thus, when a line is put under one horn and then under the other horn, the head first rotates away from the first line-clamping direction and then rotates in a direction to clamp the first placed line to provide a quick and secure clamping of the line.

It is thus an object of this invention to provide an adjustable cleat whereby a line can be quickly and reliably clamped and secured, and can be quickly and easily released for convenient line usage. It is another object to provide an adjustable cleat wherein a head carrying horns rocks with respect to a base for the clamping of a line therebetween. It is a further object to provide a cleat wherein the horns are adjustable with respect to the base so that lines of different size can be clamped therein. It is a further object to provide an adjustable cleat which is economic of construction and yet is of wide use for lines of various size so that a considerable utility is achieved with a minimum of cost. It is yet another object to provide an adjustable cleat which has a head with horns thereon which are cooperatively shaped with respect to the base to enhance line-clamping between the horns and the base.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

DESCRIPTION OF THE PREFERRED EMBODIMENT

The adjustable cleat of this invention is generally indicated at 10 in FIGS. 1, 2, 3 and 4. It comprises base 12 and head 14 which is rockable with respect to the base, as is hereinafter described.

Figure 1:
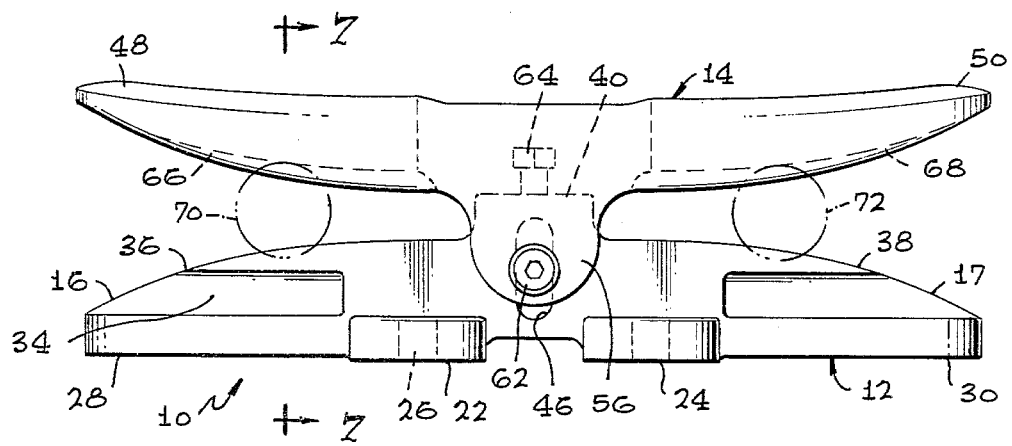
FIG. 1 is a side-elevational view of the adjustable cleat of this invention.
Figure 2:
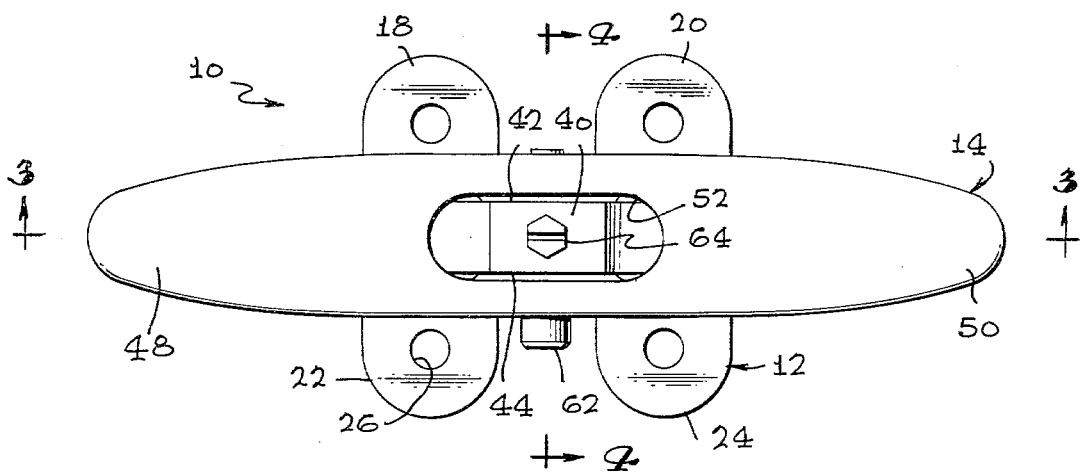
FIG. 2 is a plan view thereof.
Figure 3:
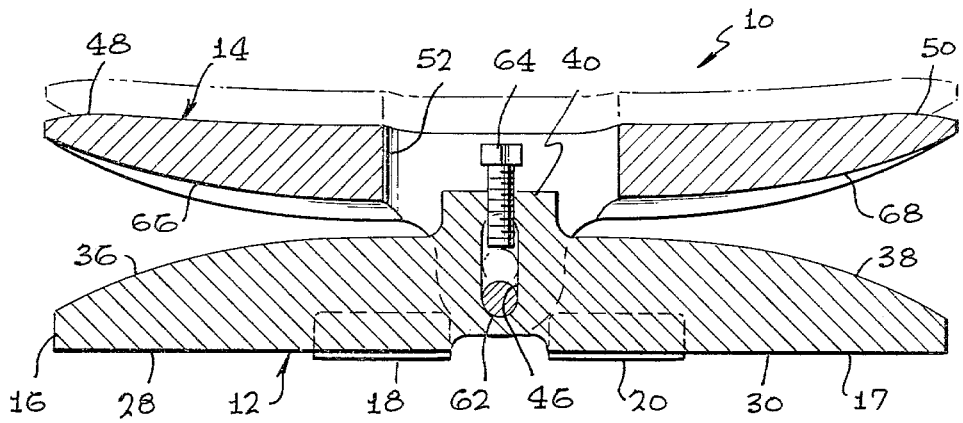
FIG. 3 is a longitudinal section therethrough, taken generally along the line 3—3 of FIG. 2.
Figure 4:
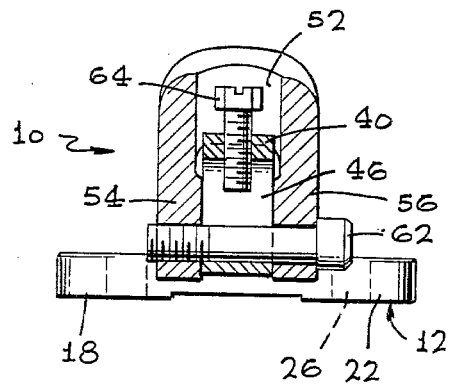
FIG. 4 is substantially a transverse center line section therethrough taken generally along the line 4—4 of FIG. 2.
Figure 7:
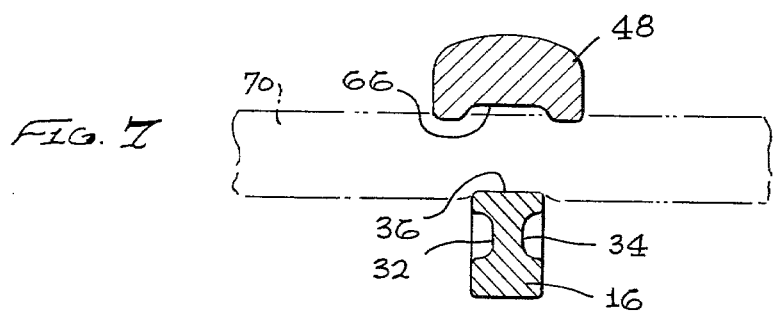
FIG. 7 is a transverse section, taken generally along the line 7—7 of FIG. 1, showing the manner in which the cleat clamps a line.

Base 12 has elongated arms 16 and 17 on which are secured the four feet 18, 20, 22 and 24. These feet are each provided with an opening therethrough, such as opening 26 in foot 22, so that the base may be secured down to a surface for the securement of cleat 10. Usually, the cleat 10 will be secured on the deck of a boat or ship for the securement of lines thereto. The feet 18 through 24 extend down below the bottom surfaces 28 and 30, respectively, of arms 16 and 17 so that the feet clamp solidly on the deck surface for firm clamping, with clearance under the arms. The arms are recessed along the sides with recesses 32 and 34 to provide adequate strength with convenient production. The tops of the arms 16 and 17 are respectively provided with engagement surfaces 36 and 38 which serve as one side of the line engagement of the cleat. As is seen in FIG. 7, surface 36 is fairly straight in the direction of line engagement, and, as seen in FIGS. 1 and 3, the surfaces are smoothly and uninterruptedly curved downward as the arms 16 and 17 extend outward.

Figure 6:
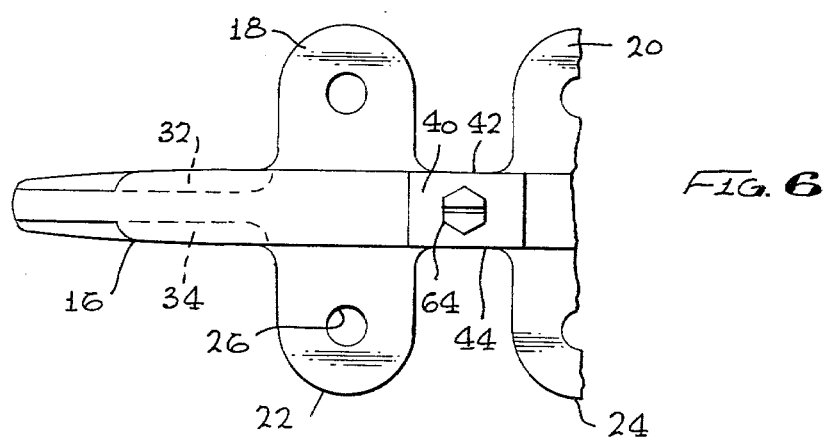
FIG. 6 is a plan view of the base of the cleat of this invention, with a portion thereof broken away.

Boss 40 extends upward at the center part of base 12. Boss 40 has flat engagement faces 42 and 44 which are parallel to the upright longitudinal plane through the center of cleat 10. These faces lie substantially in line with the sides of arms 16 and 17, see FIG. 6. Thus, the engagement faces extend down the sides of the arms as well as the upstanding boss. Transverse slot 46 is oriented in the upward direction in the base 12 and extends up into the lower part of boss 40, see FIGS. 1, 3 and 4.

Figure 5:
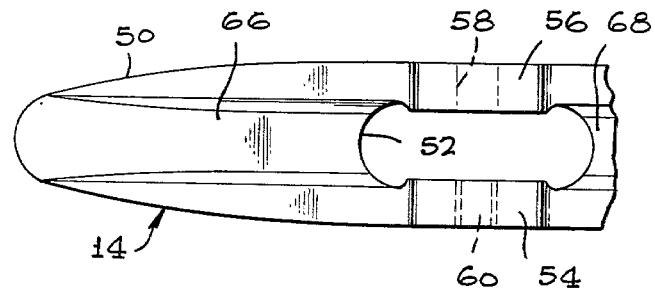
FIG. 5 is a bottom view of the head of the cleat of this invention, with a portion thereof broken away.

Head 14 has horns 48 and 50 extending from the center thereof positioned over the arms 16 and 17, respectively, and smoothly and uninterruptedly curved upwardly. Between the horns 48 and 50, head 14 has an interior opening 52, with downwardly directed flanges 54 and 56 extending downward next to the opening 52. Flange 56 has a clearance hole 58, while flange 54 has a threaded hole 60, see FIG. 5. Capscrew 62 extends through these holes and through the slot 46. The slot is fairly close to the capscrew in the widthwise direction of the capscrew and thus heads 14 can rock on the base 12 substantially only along the axis of the capscrew 62. In view of the size of the slot 46, the head is constrained to move with respect to the base only on the pivot axis of the capscrew or in the direction of the capscrew sliding up and down in the slot. Because of these constraints, the horns 48 and 50 always lie respectively over the corresponding arms on the base 12. Excursion in the upward direction is limited by adjustment screw 64 which is engaged in a threaded hole in the top of boss 40 extending down into slot 46. Thus, the lower end of the adjustment screw 64 limits the upward excursion of the head with respect to the base. Adjusting screw 64 is accessible through the top of interior opening 53.

Horns 48 and 50 are substantially the same length as arms 16 and 17. The underside of the horns 48 and 50, respectively, have longitudinal grooves 66 and 68, see FIGS. 1, 3 and 5. These longitudinal grooves face the engaging surfaces 36 and 38, respectively, and are wider than the engaging surfaces in the direction the line is engaged in the cleat 10, as is shown in FIG. 7. This permits the cleat to have an additional bite on the line for more secure fastening.

In use, the cleat 10 is adjusted so that, when a line of particular size is engaged under both horns thereof, it extends approximately halfway into the jaw formed of each cooperating arm and horn, as shown for bights 70 and 72 illustrated in FIG. 1. It can be seen from FIG. 1 that, due to the rocking capability of the head 14, the clamping force of the cleat on one bight of the line is the same as on the other. Quite often, when the bight 70 of the line is first inserted into the cleat 10, head 14 racks to the right so that it enters farther into the jaw under horn 48, that is, closer to the pivot on the axis of capscrew 62. Now, when the second bight 72 is pulled under the other horn 50, it is closer out to the end. Now, the force of clamping onto the first bight 70 is multiplied by the leverage ratio. In this way, tight and secure cleating of the line is achieved. The cleat 10 has a considerable latitude in line diameter which can be successfully cleated therein without adjustment, because of the divergent shape of the jaws defined by the horns and arms when the head is in its center position. However, for the extreme ranges of line sizes which can be secured by adjustable cleat 10, adjustment of screw 64 will be desirable.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A cleat comprising:
a base;
a plurality of feet on said base for attaching said base;
first and second arms on said base, said arms being directed away from each other, said feed being positioned below said arms so that when said feet are attached to a surface, said arms are spaced from the surface;
an opening through said base and between said arms in a direction transverse to said arms, said opening being a slot extending in a direction away from said feet in a direction substantially normal to said arms;
a head having first and second depending flanges thereon, said first and second flanges embracing said base on each side thereof at said slot through said base, a pivot pin extending through said flanges and through said slot opening so that said head is rockably mounted on said base on said pivot pin, an adjustment screw threadedly engaged in said base and extending into said slot to limit the opening of said slot to adjustably limit the upward motion of said pivot pin in said slot;
first and second horns on said head, said first and second horns being respectively positioned adjacent said first and second arms to respectively coact with said arms to clamp a line therebetween, said horns being divergent from said arms in a direction away from said pivot pin so that the jaws defined by said horns and said arms are capable of receiving and clamping lines of different sizes, so that lines of different sizes can be secured in said cleat and adjustment of said screw in said slot provides for cleat securement of a broad range of line size.

2. The cleat of claim 1 wherein each of said horns has a longitudinal groove therein for providing a double bite clamping of a line between each said horn and its coacting arm.

3. The cleat of claim 2 wherein said opening through said base is an upwardly extending slot so that said head can move in the direction of said slot as well as rock about the axis of said pivot pin in said slot.

4. The adjustable cleat of claim 3 wherein there is an opening in the top of said head to provide access to said adjustment screw.

5. A substantially symmetrical cleat comprising: a base;
means on said base for attaching said base;
first and second substantially identical arms on said base, said arms respectively having top engagement surfaces extending away from each other, said engagement surfaces being smoothly and uninterruptedly curved downwardly in the direction away from each other, said arms having a width dimension across said arms;
an upstanding boss on said base between said arms;
a head having first and second downwardly directed flanges, said flanges embracing said boss, a pivot pin extending through both of said first and second flanges and through said boss upstanding on said base to provide rocking motion of said head with respect to said base on the axis of said pivot pin, said pivot pin lying substantially normal to the direction of said first and second arms extending away from each other;
first and second substantially identical horns on said head, said horns being substantially the same length as said arms, said horns having a width direction in the transverse direction thereto, substantially parallel to said pivot pin and in the same direction, said horns both being wider in the width direction than said arms, said horns each having a longitudinal groove therein facing said arms, said longitudinal grooves in said horns being substantially as wide as said arms, said horns being smoothly and uninterruptedly curved upwardly in the direction away from each other and divergently shaped with respect to said arms so that they are spaced farther away from each other away from said pivot pin and being positioned and shaped to coact with said engagement surfaces on said arms so that lines of varying sizes can be clamped under both of said horns so that rocking motion of said head causes the line under said first horn to clamp a bight of said line under said second horn and said grooves in both of said horns coact with said arms to provide double bite clamping of each line bight between each said horn and its coating arm so that the combination of both said horns provide quadruple bite clamping of said line.

6. The cleat of claim 5 wherein said pivot pin is fixed in said head and is engaged in a slot in said base.

7. A cleat comprising:
   a base;
   means on said base for attaching said base;
   first and second arms on said base, said arms respectively having top engagement surfaces extending away from each other, said engagement surfaces being curved downwardly in the direction away from each other, said arms having a width dimension across said arms;
   a slotted opening through said base between said arms;
   a head having a flange, a pivot pin fixed in said head and extending through said slotted opening in said base to provide rocking motion of said head with respect to said base on the axis of said pivot pin, said pivot pin lying substantially normal to the direction of said first and second arms extending away from each other, an adjustment screw extending into said slotted opening to limit pivot pin motion in said slotted opening;
   first and second horns on said head, said horns having a width direction in the transverse direction thereto, substantially parallel to said pivot pin and in the same direction, said horns both being wider in the width direction than said arms, said horns each having a longitudinal groove therein facing said arms, said longitudinal grooves in said horns being substantially as wide as said arms, said horns being divergently shaped with respect to said arms so that they are spaced farther away from each other away from said pivot pin and being positioned and shaped to coact with said engagement surfaces on said arms so that a line can be clamped under both of said horns so that rocking motion of said head causes the line under said first horn to clamp a line under said second horn and said grooves in said horn coact with said arms to provide double bite clamping of each line between said horn and its coacting arm.

8. The cleat of claim 7 wherein there is an interior opening in said head to provide access to said adjustment screw.

* * * * *